Nov. 30, 1954  L. E. W. MONTROSE-OSTER  2,695,585
CONTROL APPARATUS FOR SHIP STABILIZING EQUIPMENT
Filed Oct. 28, 1949  2 Sheets-Sheet 1

Inventor
LOUIS E. W. MONTROSE-OSTER
By Blair & Black
Attorneys

Nov. 30, 1954   L. E. W. MONTROSE-OSTER   2,695,585
CONTROL APPARATUS FOR SHIP STABILIZING EQUIPMENT
Filed Oct. 28, 1949   2 Sheets-Sheet 2

United States Patent Office 2,695,585
Patented Nov. 30, 1954

2,695,585

CONTROL APPARATUS FOR SHIP STABILIZING EQUIPMENT

Louis Eugene Widolt Montrose-Oster, Brussels-Boitsfort, Belgium, assignor to Pollopas Patents Limited, London, England, a British company Application October 28, 1949, Serial No. 124,151

Claims priority, application Great Britain October 29, 1948

7 Claims. (Cl. 114—122)

A perfect equipment for the stabilisation of ships, must be able to create, at each instant, a couple having a value equal to that exerted externally on the ship but in the opposite sense. A perfect system of control must consequently be able to actuate the stabilising apparatus without the slightest delay. Thus it must be influenced by the cause, for example of rolling (sea couple), rather than by the effect (angle of rolling and its derivatives and integrals). Moreover, it must function correctly and automatically under all circumstances; that is to say, it must not act in cases for example of a more or less static list occasioned by a constant wind or an asymetrically loaded cargo. It is also necessary that whilst neutralising the effect exerted by the sea couple on the ship, it tends to stabilise it in a vertical position. The control system described in Patent No. 2,130,929, issued September 20, 1938, satisfies these conditions.

An object of the invention is to provide an improved control apparatus for ship stabilising equipment, for producing the resultant of the various components or influencing factors which have to be taken into account in controlling the operation of the stabilising equipment.

In order that the invention may be more clearly understood, an embodiment thereof will now be described, by way of example, with reference to the accompanying drawings, in which:

Fig. 4 is a schematic arrangement of the mechanical and electrical parts of the totalisator and regulator.

The control apparatus to be described comprises the following parts:

(a) An apparatus capable of measuring, in a simple and correct manner, the pressure exerted by the water at several points on the hull, (b) A gyroscope capable of detecting the angle to the vertical and its time derivatives, (c) A totalisator which mechanically produces the resultant of several linear or angular movements, (d) A regulator controlling the operation of the stabilising equipment, that is to say the magnitude and the sense of the stabilising couple furnished by it.

The apparatus to be described enables account to be taken of any desired number of factors of which the influence can exert itself as a linear or angular function. Their relative values can be adjusted, at will, from a positive maximum to a negative maximum. Each factor can act either alone or in combination with a desired number of other factors.

By way of example, which is not to be regarded as limiting the scope of the invention, one method of effecting the control will be described which takes account of the four following factors:

(1) The sea couple,
(2) The angle of rolling $\theta$;
(3) The angular speed of rolling $$\frac{d\theta}{dt}$$

(4) The angular acceleration of rolling $$\frac{d^2\theta}{dt^2}$$

Figure 1:
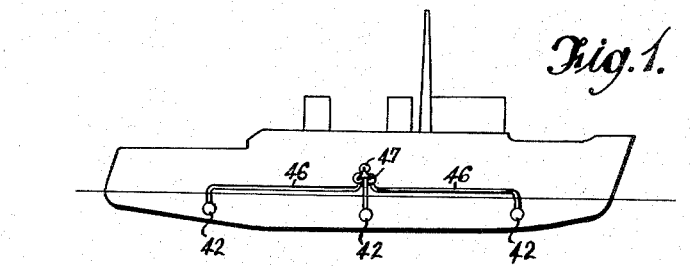
Fig. 1 is a side view of a ship showing the disposition of the devices for measuring the hydrostatic pressure on the side of a ship.
Figure 2:
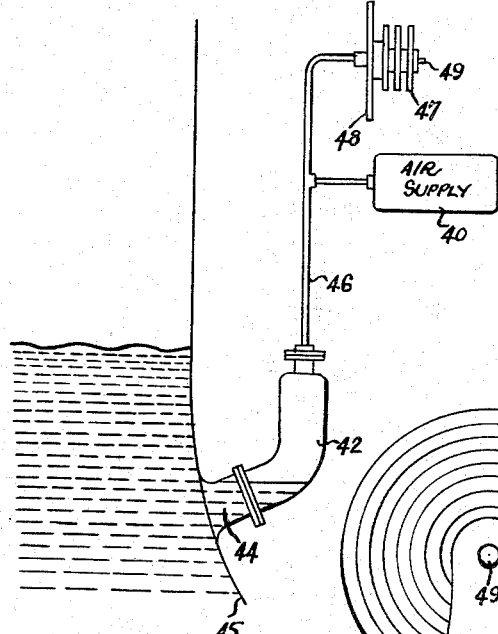
Fig. 2 is a section on an enlarged scale through the ship showing the arrangement of one of the measuring devices.

They are detected in the following manner:

1. The sea couple exerted on a ship is proportional to the difference between the pressures exerted by the water on the starboard and port sides respectively. It has been proved that the mean of three measuring devices disposed on one side gives a proportional indication, which is sufficiently accurate, of the pressure exerted by the sea on that side of the ship. According to a feature of the invention, these values are detected and measured as follows:

Referring to Figs. 1 and 2, on each side of the ship and preferably in the neighborhood of the bilge (i. e. where the vertical side of the hull begins to curve inwards), the hull 45 is furnished with three pneumatic cloches 42, which are suitably spaced apart and which are in communication with the exterior water through apertures 44 formed in the hull. Each cloche is connected by a conduit 46 to a manometric capsule 47 carried by a fixed wall 48. A source of air supply 40 is provided which is connected to the conduit 46 through the conduit 41, so as to enable the cloche 42 to be maintained filled with air to the exterior orifice 44. It is important to furnish this steady air supply in order to neutralise the loss of air by resorbtion or other causes which, without this precaution, would quickly lead to falsification of the results.

Thus, the pneumatic cloches 42 remain constantly filled with air and the relative expansion of the manometric capsules 47 is proportional to the hydrostatic pressure exerted by the water through the air column. This arrangement suppresses the danger of the apparatus becoming fouled or encrusted. The water is only in contact with a layer of air. It thus suffices to measure the values of the expansion observed in the different capsules (three for each side and six per ship) and to take the mean at each side in order to know, at each instant, the value of the average pressure exerted by the water on each side of the ship.

Figure 3:
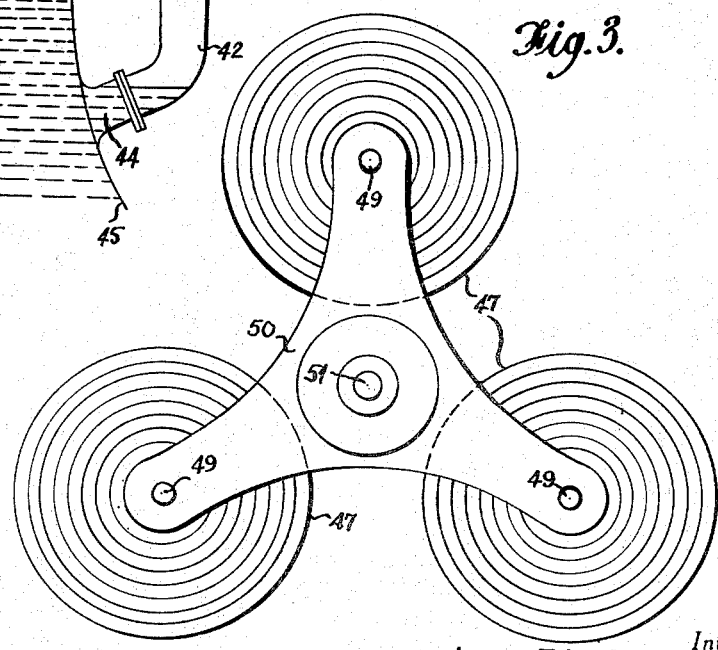
Fig. 3 is an arrangement for deriving the average hydrostatic pressure from the three measuring devices on one side of a ship.

This mean value may be determined by mechanically adding the indications of the three capsules associated with the same side of the ship. Fig. 3 shows one manner in which this may be effected. The three capsules are disposed in the form of an equilateral triangle. A star or spider 50 with three arms arranged at 120° to one another is positioned with its arms bearing against the three capsule centres. In this way the displacement of the central point 51 of the star or spider 50 will be proportional to the average pressure exerted by the water on the corresponding side of the ship.

2. The angle of rolling $\theta$ is indicated directly by a gyroscope, of which only the main lever is shown at 1 in Fig. 4, either as a linear or angular function. This lever 1, which swings about the axis 1', executes an angular movement which is proportional to the angle of rolling $\theta$.

3. The angular speed of rolling $$\frac{d\theta}{dt}$$

is detected through the intermediary of the same gyroscope by means of a tachometer dynamo. In the embodiment illustrated in Fig. 4, the main lever 1 of the gyroscope terminates in a circular sector 2 which is in frictional engagement with a roller coupled, if necessary through suitable gearing, to the armature 6 of a direct current dynamo, the exciter winding of which is energised with a constant electric current. The armature 6 is thus rotated by the movement of the lever 1 of the gyroscope and furnishes an electromotive force which is directly proportional to the angular speed of rolling $$\frac{d\theta}{dt}$$

4. The angular acceleration of rolling is detected through the intermediary of the same gyroscope, also in an indirect manner, either as a linear or an angular function, by means of methods which form the subject of either British Patent No. 604,598 or of U. S. Patent 2,530,717, issued November 21, 1950. Preferably the apparatus described in the last mentioned patent is used, the movements of the central point of the rocking bar in response to the angular acceleration being transmitted to the lever arm 10' through the rod 9' (Fig. 4).

The values (variable in time) of these four influencing factors which it is desired to take into account constitute the components which are combined in a totalisator, which instantaneously forms their resultant which is, in turn, employed to actuate the regulator controlling the operation of the stabilising equipment.

One embodiment of an electro-mechanical totalisator is illustrated diagrammatically in Fig. 4.

The totalisator illustrated in Fig. 4 produces the resultant of the four influencing factors. The three factors (1), (2) and (4) are combined to displace a slider 7 of a potentiometer 8 forming a part of a circuit fed with current of constant intensity, the output potential of the potentiometer being combined with the electromotive force of the dynamo 6, representing factor (3) to control the operation of the regulator 62. The angle of rolling $\theta$ (factor No. 2) which is detected by the gyroscope 20 is transmitted to the totalisator by a rod 9 pivoted at one end of the main lever 1 of the gyroscope and at its other end to a lever 10 forming part of the totalisator. The lever 10 moves about a fixed pivot 12 and is rigid with a double-armed lever 11 formed with a slot 13 in which can be adjustably moved a slider 13a, means, such as a wing nut 13b, being provided for holding it in its adjusted position in the slot. The slider 13a is pivotally connected to the rod 14. When the slider 13a is at the middle of the lever 11, rod 14 will not move when the levers 10 and 11 are moved. When the rod is displaced towards one end of the lever 11, it will be moved in one direction when the arm 10 is moved, and if at the other end of the lever 11 it will move in the opposite direction for the same direction of movement of the arm 10. The arrangement described thus enables the extent and direction of movement of the rod 14, for a predetermined movement of the rod 9, to be adjusted at will between a positive maximum to a negative maximum.

The movement indicating the angular acceleration of rolling $$\frac{d^2\theta}{dt^2}$$

(factor No. 4) which is detected by the aid of an apparatus 21 constructed as described, for example, in the above-mentioned specification of United States Patent 2,530,717 of which only the lever 4 and its pivot 3 are shown in Figure 4, these parts bearing the same reference numerals as in the patent referred to. The apparatus 21 is controlled from the gyroscope 20 by the gyroscope servo motor 20'. The movement of the lever 4 is applied through the rod 9' to the lever arm 10' which actuates the lever 14' through the medium of a double-arm lever 11' in the manner already described for the lever 10. The rod 14' will thus be displaced proportional to $$\frac{d^2\theta}{dt^2}$$

this displacement being capable of adjustment in exactly the same manner as was the case for $\theta$.

The sea couple (factor 1) is applied to the totalisator in the following manner. The hydrostatic pressure on one side of the ship, as indicated by the movement of the central point 51 of the spider 50, is applied to one end of a lever 56 of which the pivotal point 52 can be adjusted by longitudinally moving the slider 53 in suitable guides and locking it in the adjusted position. The other end of the lever 56 is pivotally connected to the central point 54 of the rocking arm 55. It will be seen that by varying the position of the pivotal point 52 the relation between the lengths of the arms b and c of the lever 56 can be modified so that the movement of the pivotal point 54 for any predetermined movement of 51 may be adjusted at will, together with the possibility of reducing this movement to zero when the pivtal points 52 and 54 are coincident.

On the other side of the ship, the point 51', the movements of which indicate the hydrostatic pressure on that side, effect the movement of the lever 56' and the rocking arm 55' in like manner.

The upper ends of the rocking arms 55 and 55' are connected by rods 57, 57' respectively to opposite ends of the rocking arm 58 pivoted at 59 on the toothed quadrant 60 which can pivot about the axis 60', the teeth of the quadrant 60 meshing with a pinion 61 which actuates the slider 7 of the potentiometer 8. The lower ends of the rocking arms 55, 55' are connected to the free ends of the rods 14', 14 respectively. The three rocking arms 55, 55' and 58 constitute three differential systems arranged in pyramidal form.

It will be seen that when the pivots 52 are above the pivotal points 54 of the rocking arms 55, that is to say when the totalisator is to take account of the sea couple, the manometers on the port and starboard sides act in opposite directions. Suppose, for example, that the ship sinks lower in the water, the hydrostatic pressure on the pneumatic cloches, and thus on the manometric capsules, will increase by the same extent on both the port and starboard sides. The centres 51, 51' of the spiders will thus advance by the same amount in the outward directions, thus turning the levers 56, 56' about their pivotal points 52, 52'. The movement of the lever 56 will be in an anti-clockwise direction, whilst that of the lever 56' will be in the clockwise direction. Thus the lower ends of the levers 56, 56' come closer together and the pivotal points 54, 54' will move in the same manner. The lower extremities of the rocking arms 55, 55', however, are connected to the lever systems 10', 11' and 10, 11 by the rods 14', 14 respectively, and cannot follow the movement of the levers 56, 56' so long as the levers 10' and 10 are not being moved under the action of the factors (2) and (4).

The upper extremities of the rocking arms 55, 55' will, therefore, approach one another by a distance twice as great as the movement of the points 54, 54', and the rods 57, 57' will execute similar movements. The rocking arm 58 of the summit differential will thus execute an angular movement in the anti-clockwise direction, the upper and lower ends thereof being displaced by equal amounts in opposite directions. Its pivot 59 thus remains stationary in space and the sector 60 is not moved. Thus the regulator is not influenced by a variation of the hydrostatic pressure which is equal on both sides of the ship.

Assuming now that a wave hits the ship, increasing the water level on the port side and lowering it on the starboard side. It will be seen that the manometers on the port side will react exactly as in the previous case, the rod 57 displacing the lower extremity of the rocking bar 58 towards the right. The manometers on the starboard side, however, will retract their central point 51' towards the left, as a result of which the rod 57' actuating the upper extremity of the rocking bar 58 will be displaced towards the right. The rocking bar 58 will therefore no longer execute an angular movement about its pivot 59, but will be displaced bodily towards the right, and since its pivot 59 is fixed to the sector 60, this latter will execute an angular movement in an anti-clockwise direction. The pinion 61 will thus execute a movement in the clockwise direction and displace the slider contact 7 towards the right, which will actuate the regulator to control the operation of the stabilising equipment so as to produce a stabilising couple in opposition to the sea couple.

The movements of the levers 10 and 10', in response to the factors (2) and (4) will cause movement of the sector 60 in a manner similar to that above described. The response of the slider 7 to the action of factor (2) is such that it adds to that of factor 1 if the ship commences to roll towards starboard. The totalisator also takes account of factor (4) in a similar manner to factor (2) acting in a direction to retard the movement of the ship.

The resultant of the factors (1), (2) and (4) is thus indicated by the adjusted position of the slider 7 and produces corresponding electromotive force in the circuit of the regulator 62 for controlling the stabilising equipment. To this electromotive force is added that produced by the armature 6 of the direct current dynamo which moves in response to the angular speed of rolling (factor 3). A rheostat 64 controls the exciter winding of this dynamo in order to adjust, at will, the value of the electromotive force fed to the circuit by the armature 6. If it be desired to eliminate entirely factor (3), the excitation current may be interrupted by the switch 65 and the armature short-circuited by the switch 66.

The regulator 62 comprises a moving coil member influenced by an exciter winding 68. The moving coil is connected to a sector 74, pivoted at 73, through a spring coupling 72. The sector 74 is arranged to roll on a bank of contacts 75 constituting the tapping points on a potentiometer 23 the output from which is used to control a motor driving arrangement for the stabilising equipment 22 of the ship. This stabilising equipment preferably comprises a movable weight in the form of a truck which is movable back and forth on a track arranged transversely of the ship. One embodiment of such a stabilising equipment is described in the specification of my copending application Serial No. 124,152, filed October 28, 1949, in which the regulator 62, sector 74, contacts 75 and potentiometer 23 are shown with the same reference numbers, these parts being located in the casing 16 carried on the truck and controlling the motor driving arrangement thereof as more fully described in that specification. The regulator 62 thus executes movements in one direction or the other proportional to the value of the electromotive force traversing its winding. In rolling on the bank of contacts the sector 74 controls the operation of the stabilising equipment to exert a stabilising couple in one direction or the other.

It will be understood that it will be as easy to influence the result by the integrals as by the time derivatives of the angle of rolling.

In the case where it is desired to stabilise the ship about the apparent vertical, instead of the true vertical, it suffices to replace the gyroscope by a device indicating the apparent vertical.

It will be understood that various modifications may be made without departing from the spirit of the invention, and that protection is sought for the various components of the system herein described, both separately and in any combination. It will also be realised that the arrangement can be used in the reverse manner, namely for regulating the production of an artificial roll, for example by reversing the polarity of the moving coil of the regulator 62.

Furthermore, the invention can also be applied to the stabilisation of vessels in general or to the stabilization of only part of a ship, such as a gun mounting on a ship, which can obviously be effected with less power than that required for the stabilisation of the whole ship and reference herein to "ship" stabilisation is intended to include stabilisation of all floating vessels and also of only part of a vessel.

I claim:

1. Control apparatus for ship stabilizing equipment, comprising at least three differential systems, each comprising two adjusting members and a differential output member, means connecting the adjusting members of the first differential system to the differential output members of the second and third differential systems respectively, means for detecting the hydrostatic pressures at opposite sides of the ship, means controlled by said detecting means for deriving two movements corresponding respectively to the variations in the said hydrostatic pressures at opposite sides of the ship, means for deriving a third movement proportional to the angle of rolling of the ship, means for deriving a fourth movement proportional to the angular acceleration of rolling of the ship, and connections for actuating the adjusting members of the second and third differential systems by the said four movements respectively.

2. Apparatus as claimed in claim 1, comprising also a regulator responsive to the value of an electromotive force for adjusting the stabilising equipment, a source of electromotive force connected to adjusting means for varying the value of said electromotive force, means actuating said adjusting means by the resultant movement of the differential output member of the first differtian system, and electrical connections feeding the output electromotive force from said adjusting means to the regulator.

3. Apparatus as claimed in claim 2, wherein means are provided for deriving an electromotive force proportional to the angular speed of rolling of the ship, and means for adding this electromotive force to the output electromotive force from said adjusting means.

4. Control apparatus for ship stabilising equipment comprising a movable control member, a rocking arm pivotally connected at its midpoint to said movable member, second and third rocking arms, means connecting the ends of said first rocking arm to one end of each of said second and third rocking arms respectively, means for detecting the hydrostatic pressures at opposite sides of the ship, means controlled by said detecting means for deriving two movements corresponding respectively to the variations in the said hydrostatic pressures at opposite sides of the ship, connecting means for actuating the central points of said second and third rocking arms by said two movements respectively, means for deriving a third movement proportional to the angle of rolling of the ship, means for deriving a fourth movement proportional to the angular acceleration of rolling of the ship, and connecting means for actuating the other ends of each of said second and third rocking arms by said third and fourth movements respectively.

5. Control apparatus for ship stabilising equipment, comprising at least three differential systems, each comprising two adjusting members and a differential output member, driving connections between the adjusting members of the first differential system and the differential output members of the second and third differential systems respectively, two devices for detecting the hydrostatic pressures on the port and starboard sides of the ship respectively, connections for actuating one of the adjusting members of each of the second and third differential systems by variations of the two detecting devices respectively, a first lever actuated by a device which detects the angle of roll of the ship, a second lever actuated by a device which detects the angular acceleration of rolling of the ship, connections between said first and second levers and the other adjusting members of the second and third differential systems respectively, a potentiometer connected across a source of voltage, a slider on said potentiometer, connecting means for actuating said slider by the differential output member of the first differential system, a tachometric dynamo which is driven by a device which detects the angular speed of rolling of the ship and produces an electromotive force proportional to said angular speed of rolling, a regulator for adjusting the stabilising equipment and comprising a moving coil rotatably mounted in an energising field so as to move through an angle proportional to the electromotive force applied thereto, and an electric circuit extending from a contact on the potentiometer, through said dynamo and said moving coil, and back to the slider of the potentiometer.

6. Control apparatus for ship stabilising equipment, comprising a movable control member, a first rocking arm pivotally connected at its mid-point to said movable control member, second and third rocking arms, means connecting the ends of said first rocking arm to one end of each of said second and third rocking arms respectively, two devices for detecting the hydrostatic pressures on the port and starboard sides of the ship respectively, connections for moving intermediate points of the second and third rocking arms by variations of the two detecting devices respectively, a first lever actuated by a gyroscope to detect the angle of roll of the ship, a second lever actuated by a device which is controlled by said gyroscope and detects the angular acceleration of rolling of the ship, connections between said first and second levers and the other ends of the second and third rocking arms respectively, a potentiometer connected across a source of voltage, a slider on said potentiometer, a connection for actuating said slider by the movement of the movable control member, a tachometric dynamo driven by a device which is controlled by the gyroscope and detects the angular speed of rolling of the ship and producing an electromotive force proportional to said angular speed of rolling, a regulator for adjusting the stabilising equipment and comprising a moving coil rotatably mounted in an energising field so as to move through an angle proportional to the electromotive force applied thereto, and an electric circuit extending from a contact on the potentiometer, through said dynamo and said moving coil, and back to the slider of the potentiometer.

7. Control apparatus for ship stabilising equipment, comprising a plurality of cloches divided into two groups, the lower ends of each of the cloches of the first group fitting over one of a plurality of apertures in the hull of the ship and spaced along the port side thereof and the lower ends of each of the cloches of the second group fitting over one of a plurality of apertures in the hull of the ship and spaced along the starboard side thereof, means for feeding a gas to said cloches to maintain them filled with gas, a plurality of pressure-sensitive devices arranged respectively to measure the pressure of the gas in the upper part of each of said cloches, means for deriving a first resultant proportional to the sum of the pressures measured by the several pressure-sensitive devices associated with the cloches along the port side of the ship, means for deriving a second resultant proportional to the sum of the pressures measured by the several pressure-sensitive devices associated with the cloches along the starboard side of the ship, gyroscopic means for detecting the angle of rolling of the ship and its time derivatives and for producing control movements proportional thereto, a totalisator producing a final resultant of the said first and second resultants, and said control movements, a regulator for controlling the operation of the stabilising equipment, and means for actuating said regulator by the final resultant produced by the totalisator.

References Cited in the file of this patent

UNITED STATES PATENTS

| Number | Name | Date |
|---|---|---|
| 2,017,072 | Minorsky | Oct. 15, 1935 |
| 2,130,929 | Rocard | Sept. 20, 1938 |
| 2,338,147 | Von Den Steinen | Jan. 4, 1944 |
| 2,391,852 | Winton | Dec. 25, 1945 |
| 2,438,330 | Winton | Mar. 23, 1948 |
| 2,446,754 | Garrett et al. | Aug. 10, 1948 |
| 2,471,026 | Eby | May 24, 1949 |
| 2,481,039 | Ross | Sept. 6, 1949 |

FOREIGN PATENTS

| Number | Country | Date |
|---|---|---|
| 457,413 | France | July 10, 1913 |
| 517,163 | Great Britain | Jan. 22, 1940 |